United States Patent
Nakatani (10) Patent No.: US 10,939,008 B2
(45) Date of Patent: Mar. 2, 2021

(54) IMAGE FORMING APPARATUS

(71) Applicant: KYOCERA Document Solutions Inc., Osaka (JP)

(72) Inventor: Takanobu Nakatani, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/746,004

(22) Filed: Jan. 17, 2020

(65) Prior Publication Data

US 2020/0259970 A1 Aug. 13, 2020

(30) Foreign Application Priority Data

Feb. 12, 2019 (JP) .............................. JP2019-022844

(51) Int. Cl.
*H04N 1/00* (2006.01)

(52) U.S. Cl.
CPC ..... *H04N 1/00724* (2013.01); *H04N 1/00591* (2013.01); *H04N 1/00631* (2013.01); *H04N 1/00761* (2013.01); *H04N 1/00769* (2013.01)

(58) Field of Classification Search
CPC .......... H04N 1/00591; H04N 1/00631; H04N 1/00724; H04N 1/00761; H04N 1/00328; H04N 1/0035; H04N 1/00596; H04N 1/00734; H04N 1/00779; H04N 1/00811; H04N 1/2323; H04N 1/2369; H04N 1/2376; B41J 29/393; B41J 2/0451; B41J 2/0457; B41J 2/16552; B41J 11/009; G03G 15/0896; G03G 15/161; G03G 21/1814; G03G 2215/1661; G03G 15/5016; G03G 15/5029; G06K 15/4065; G06K 15/408; G06K 9/00456

USPC .................................................. 358/474, 498
See application file for complete search history.

(56) References Cited

U.S. PATENT DOCUMENTS

| | | | | |
|---|---|---|---|---|
| 6,527,267 | B1* | 3/2003 | Kuwata | B65H 3/44 271/9.13 |
| 6,944,411 | B2* | 9/2005 | Iseki | G03G 15/5066 399/391 |
| 7,016,074 | B1* | 3/2006 | Fujita | H04N 1/502 358/1.9 |
| 9,216,602 | B2* | 12/2015 | Igarashi | B41J 11/001 |
| 10,294,053 | B2* | 5/2019 | Kawamura | G03G 15/6502 |

(Continued)

FOREIGN PATENT DOCUMENTS

JP H0212165 A 1/1990

*Primary Examiner* — Negussie Worku
(74) *Attorney, Agent, or Firm* — Studebaker & Brackett PC (57) ABSTRACT

An image forming apparatus includes an image reading part, an image forming part, and a sheet feeding cartridge. The image reading part reads a document and obtains image data of the document. The image forming part forms an image on a sheet on the basis of the image data. The sheet feeding cartridge stores several kinds of the sheets. In a case where predetermined sheet feeding information is applied on the document, the sheet feeding information is read on the basis of the image data. Conveying of the sheet is controlled so as to convey the sheet corresponding to the sheet feeding information from the sheet feeding cartridge to the image forming part and, on the other hand, to eject the sheet not corresponding to the sheet feeding information from the sheet feeding cartridge without passing through the image forming part.

6 Claims, 4 Drawing Sheets

(56) References Cited

U.S. PATENT DOCUMENTS

| | | | |
|---|---|---|---|
| 2004/0259016 A1* | 12/2004 | Oya | G03G 21/1814 430/125.3 |
| 2005/0128242 A1* | 6/2005 | Suzuki | B41J 29/393 347/29 |
| 2010/0086320 A1* | 4/2010 | Koizumi | G03G 15/0872 399/30 |
| 2010/0172663 A1* | 7/2010 | Nakai | G03G 15/6591 399/45 |
| 2012/0107003 A1* | 5/2012 | Hasegawa | G03G 15/2046 399/69 |
| 2012/0187620 A1* | 7/2012 | Kitamura | B65H 1/14 271/10.01 |
| 2014/0356013 A1* | 12/2014 | Nakatani | G03G 15/5004 399/88 |
| 2015/0116743 A1* | 4/2015 | Yamashita | H04N 1/2369 358/1.12 |
| 2015/0301494 A1* | 10/2015 | Kitabayashi | G03G 15/161 399/71 |
| 2016/0094751 A1* | 3/2016 | Nakatani | H04N 1/00323 358/1.13 |
| 2018/0072084 A1* | 3/2018 | Shimizu | B42C 1/00 |
| 2020/0213463 A1* | 7/2020 | Seto | H04N 1/00596 |

* cited by examiner

IMAGE FORMING APPARATUS

INCORPORATION BY REFERENCE

This application is based on and claims the benefit of priority from Japanese Patent application No. 2019-022844 filed on Feb. 12, 2019, the entire contents of which are incorporated herein by reference.

BACKGROUND

The present disclosure relates to an image forming apparatus conveying a desired sheet to an image forming part.

An image forming apparatus includes an image forming part forming an image onto a sheet, and a sheet feeding cartridge storing the sheet conveyed to the image forming part.

As an example of a conventional image forming apparatus, a copying machine previously identifies a sheet feeding device storing a predetermined sheet suitable for a copy document, automatically selects the identified sheet feeding device when creating the copy document, and creates the copy document by using the sheet stored that feeding device.

Conventionally, an image forming apparatus includes a plurality of sheet feeding cartridges in order to form images on various kinds (ground colors and thicknesses) of sheets, and stores different kinds of the sheets in the respective sheet feeding cartridges. In addition, sheet feeding is controlled so that the sheet is fed from the sheet feeding cartridge storing a desired kind of the sheet. Thus, by providing the plurality of sheet feeding cartridges, different kinds of the sheets are selectively fed.

However, the image forming apparatus may not include the plurality of sheet feeding cartridges due to constraints of cost and installation. The image forming apparatus not including the plurality of sheet feeding cartridges cannot selectively feed different kinds of the sheets.

SUMMARY

An image forming apparatus of the present disclosure includes an image reading part, an image forming part, and a sheet feeding cartridge. The image reading part reads a document and obtains image data of the document. The image forming part forms an image on a sheet on the basis of the image data. The sheet feeding cartridge stores several kinds of the sheets. In a case where predetermined sheet feeding information is applied on the document, the sheet feeding information is read on the basis of the image data. Conveying of the sheet is controlled so as to convey the sheet corresponding to the sheet feeding information from the sheet feeding cartridge to the image forming part and, on the other hand, to eject the sheet not corresponding to the sheet feeding information from the sheet feeding cartridge without passing through the image forming part.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
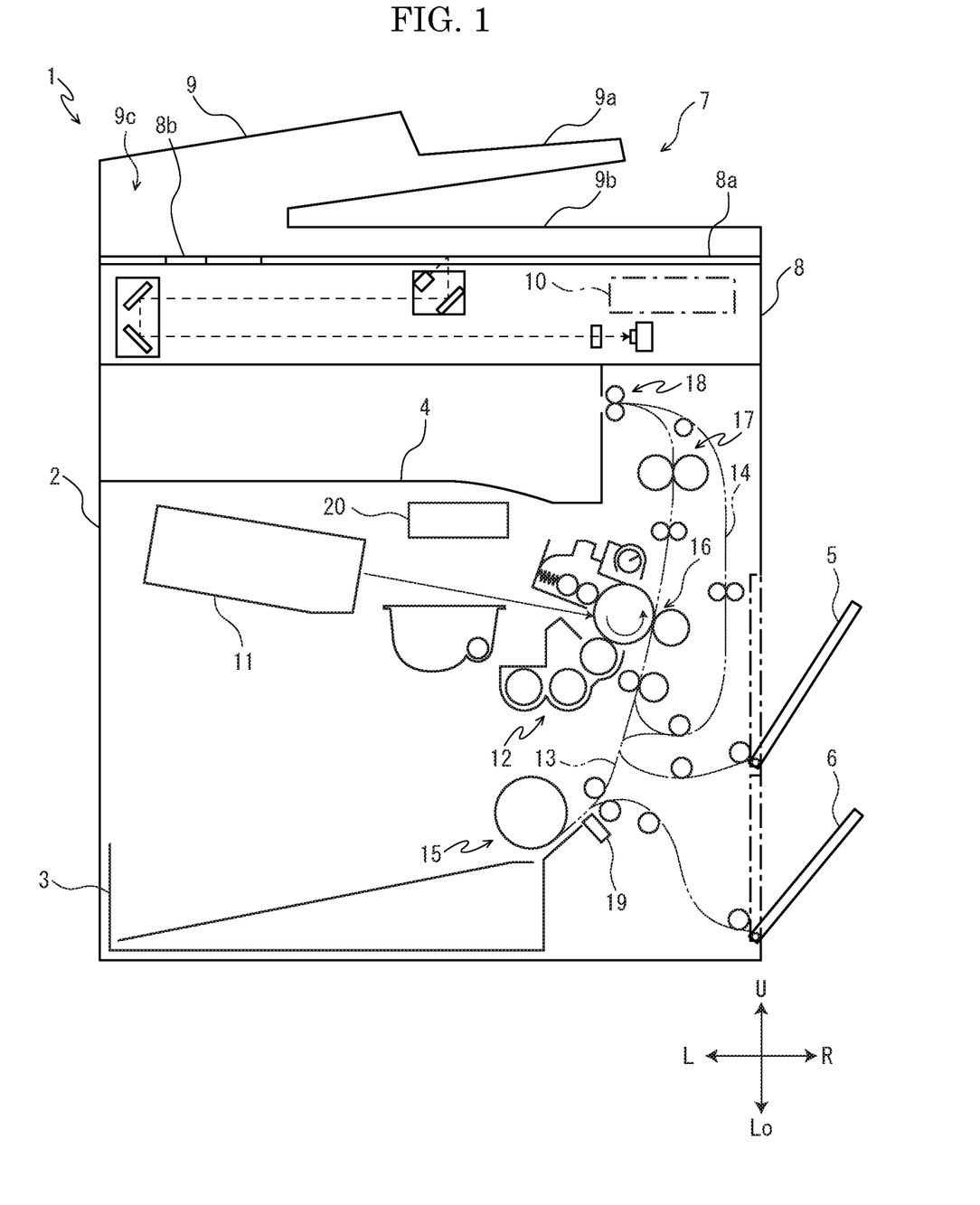
FIG. 1 is a sectional view schematically showing a multifunction peripheral according to an embodiment of the present disclosure.

First, entire structure of a multifunction peripheral 1 (an image forming apparatus) according to an embodiment of the present disclosure will be described with reference to FIG. 1. Hereinafter, for convenience of description, it will be described so that the front side of the multifunction peripheral 1 is positioned at the near side on a paper sheet of FIG. 1. Arrows L, R, U and Lo in each FIG respectively indicate a left side, a right side, an upper side and a lower side of the multifunction peripheral 1.

The multifunction peripheral 1 includes a roughly box-formed apparatus body 2. In a lower part of the apparatus body 2, a plurality of sheet feeding cartridges 3 storing sheets used for image forming are provided. In an upper part of the apparatus body 2, a first ejected sheet tray 4, on which the sheet having a formed image is ejected, is provided. In a right side part of the apparatus body 2, a manual bypass tray 5 storing the sheet outside the multifunction peripheral 1 and a second ejected sheet tray 6, on which the sheet not having a formed image is ejected, are provided. In the embodiment, the manual bypass tray 5 and the second ejected sheet tray 6 are separately provided, but the manual bypass tray 5 and the second ejected sheet tray 6 are provided as one common tray.

In the upper part of the apparatus body 2, a document reading device 7 performing scanning operation, such as document conveying and image reading, is provided. The document reading device 7 includes, as shown in FIG. 1, an image reading part 8 reading an image from a document and a document conveying part 9 conveying the document to the image reading part 8. In the image reading part 8 and the document conveying part 9, a conveying direction of the document is along left and right directions. Hereinafter, it will be described so that a longitudinal direction of the document is along the conveying direction and a width direction of the document is along a direction orthogonal to the conveying direction.

The image reading part 8 is arranged at an upper side in an in-body space of the apparatus body 2 and includes a platen glass 8a being a document table and a reading slit glass 8b. The reading slit glass 8b is arranged at a left side and the platen glass 8a is arranged at a right side from the reading slit glass 8b. Moreover, the image reading part 8 includes an optical scanning unit and an image picking-up part. The image reading part 8 scans the document placed on the platen glass 8a or the document passing on the reading slit glass 8b by being conveyed from the document conveying part 9 in a main scanning direction (forward and backward directions) and a sub scanning direction (left and right directions) to read the image of the document and to obtain image data. The image reading part 8 transmits the obtained image data to a controlling part 20 (refer to FIG. 2).

The document conveying part 9 is arranged above the image reading part 8, has a document conveying function, and is openably/closably attached as a cover member covering the platen glass 8a and the reading slit glass 8b of the image reading part 8 (or an upper face of the apparatus body 2). The document conveying part 7 includes a supply tray 9a, on which the document before image reading is placed, an ejection tray 9b, on which the document after image reading is ejected, and a conveying mechanism 9c conveying the document. The conveying mechanism 9c is arranged at the left side so as to correspond the reading slit glass 8b, the supply tray 9a is extended from an upper part of the conveying mechanism 9c to the right side, and the ejection tray 9b is extended from a lower part of the conveying mechanism 9c to the right side. The conveying mechanism 9c conveys the document on the supply tray 9a so as to pass the document through a reading position corresponding to the reading slit glass 8b and to feed out the document onto the ejection tray 9b.

Further, in the upper part of the apparatus body 2, an operation display part 10 is attached at a front side. The operation display part 10 includes, for example, operation keys, such as ten keys, a start key, a system menu key, a transmission key and a copy key, and a display device, such as a touch panel, to receive operation input from a user.

In a left part inside the apparatus body 2, an exposing part 11 composed of a laser scanning unit (LSU) is located and, in a right part inside the apparatus body 2, an image forming part 12 is arranged. In the image forming part 12, a photosensitive drum as an image carrier is rotatably arranged. Around the photosensitive drum, a charging part, a developing part connected to a toner container, a transferring roller and a cleaning part are located along a rotating direction of the photosensitive drum.

In a right part inside the apparatus body 2, a conveying path 13 for the sheet is arranged so as to run from a lower side to an upper side and, in a right side of the conveying path 13, an inversion path 14 for duplex printing is arranged. the multifunction peripheral 1 includes a plurality of conveying rollers along the conveying path 13 and the inversion path 14, and drives and rotates each conveying roller by a driving source 13a (refer to FIG. 2), such as a motor, to convey the sheet.

At an upstream end of the conveying path 13, a sheet feeding part 15 is arranged near the sheet feeding cartridge 3. At an intermediate stream portion of the conveying path 13, a transferring part 16 composed of the photosensitive drum and the transferring roller is arranged. At a downstream portion of the conveying path 13, a fixing part 17 is arranged. At a downstream end of the conveying path 13, a sheet ejecting part 18 is arranged near the first ejected sheet tray 4. Moreover, to the conveying path 13, a sheet discriminating sensor 19 is provided at a downstream side from the sheet feeding part 15. The sheet discriminating sensor 19 is configured to detect and to discriminate a kind of the sheet fed from the sheet feeding cartridge 3 by the sheet feeding part 15 and is composed of, for example, a color sensor detecting a ground color of the sheet.

The inversion path 14 is branched off from the conveying path 13 at the downstream side from the fixing part 17 and at an upstream side from the sheet ejecting part 18 and is joined to the conveying path 13 at the downstream side from the sheet feeding part 15 and at the upstream side from the transferring part 16, in a conveying direction of the sheet on the conveying path 13. In the conveying direction of the sheet on the conveying path 13, at the downstream side from the sheet feeding part 15 and at the upstream side from the transferring part 16, a path to the second ejected sheet tray 6 is branched off from the conveying path 13 and a path from the manual bypass tray 5 is joined to the conveying path 13.

Next, an image forming operation included in a copying operation or the like of the multifunction peripheral 1 will be described. In the multifunction peripheral 1, when image data is inputted and a copy start or a print start is directed from the image reading part 8 or an external computer or the like connected with the multifunction peripheral 1, the image forming operation is started. First, in the image forming part 12, the surface of the photosensitive drum is electrically charged by the charging part, and then, is exposed on the basis of the image data by a laser light from the exposing part 11, thereby forming an electrostatic latent image on the surface of the photosensitive drum. The electrostatic latent image is developed to a toner image by using a toner in the developing part.

On the other hand, the sheet stored in the sheet feeding cartridge 3 is picked up by the sheet feeding part 15 and conveyed on the conveying path 13. The sheet on the conveying path 13 is conveyed to the transferring part 16 in a given timing and the toner image on the photosensitive drum is transferred on the sheet by the transferring part 16. The sheet with the transferred toner image is conveyed to the fixing part 17, and the sheet is pressured and heated by the fixing part 17, and thereby, the toner image is fixed on the sheet. The sheet with the fixed toner image is ejected from the sheet ejecting part 18 to the first sheet ejected tray 4.

Figure 2:
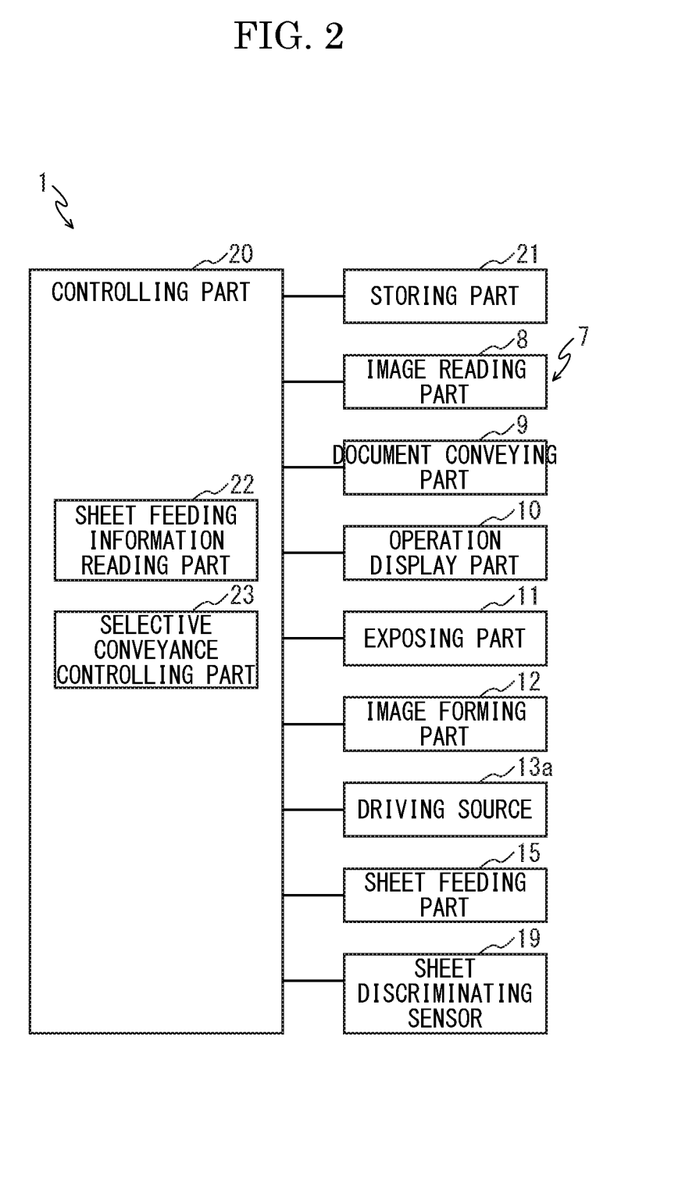
FIG. 2 is a block diagram showing electric structure of the multifunction peripheral according to the embodiment of the present disclosure.

Next, electric structure of the above-described multifunction peripheral 1 will be described with reference to FIG. 2. The multifunction peripheral 1 includes a controlling part 20 composed of a central processing unit (CPU) or the like, and a storing part 21 composed of a ROM, a RAM and others inside the apparatus body 2.

The controlling part 20 controls each component connected to the controlling part 20 on the basis of control program and control data stored in the storing part 21. For example, the controlling part 20 is connected to each part of the multifunction peripheral 1, such as the image reading part 8, the document conveying part 9, the operation display part 10, the exposing part 11, the image forming part 12, the driving source 13a for each conveying roller, the sheet feeding part 15 and the sheet discriminating sensor 19. Then, the controlling part 20 controls the scanning operation, such as document conveying in the document conveying part 9 and image reading in the image reading part 8, conveying of the sheet stored in the sheet feeding cartridge 3, the image forming operation and others. Moreover, the controlling part 20 works as a sheet feeding information reading part 22 and a selective conveyance controlling part 23 by executing programs stored in the storing part 21. Details of the sheet feeding information reading part 22 and the selective conveyance controlling part 23 are described later.

Incidentally, in a case where the multifunction peripheral 1 performs the copying operation of the document placed on the supply tray 9a of the document conveying part 9, the multifunction peripheral 1 carries out the scanning operation, such as document conveying in the document conveying part 9 and image reading in the image reading part 8, and the image forming operation in the image forming part 12 and others. At this time, the multifunction peripheral 1 may select any one of a normal mode and a sheet selecting mode as a sheet feeding mode in a case of performing the copying operation by operation via the operation display part 10.

In the normal mode, one kind of the sheet is previously stored in one sheet feeding cartridge 3, and then, the sheet stored in the sheet feeding cartridge 3 is sequentially fed. In the sheet selecting mode, several kinds of the sheets are previously stored in one sheet feeding cartridge 3, and then, a desired kind of the sheet is selected from the several kinds of the sheets stored in the sheet feeding cartridge 3 and fed. Moreover, in the sheet selecting mode, in order to select and to feed the desired kind of the sheet, the controlling part 20 works as the sheet feeding information reading part 22 and the selective conveyance controlling part 23.

Figure 4:
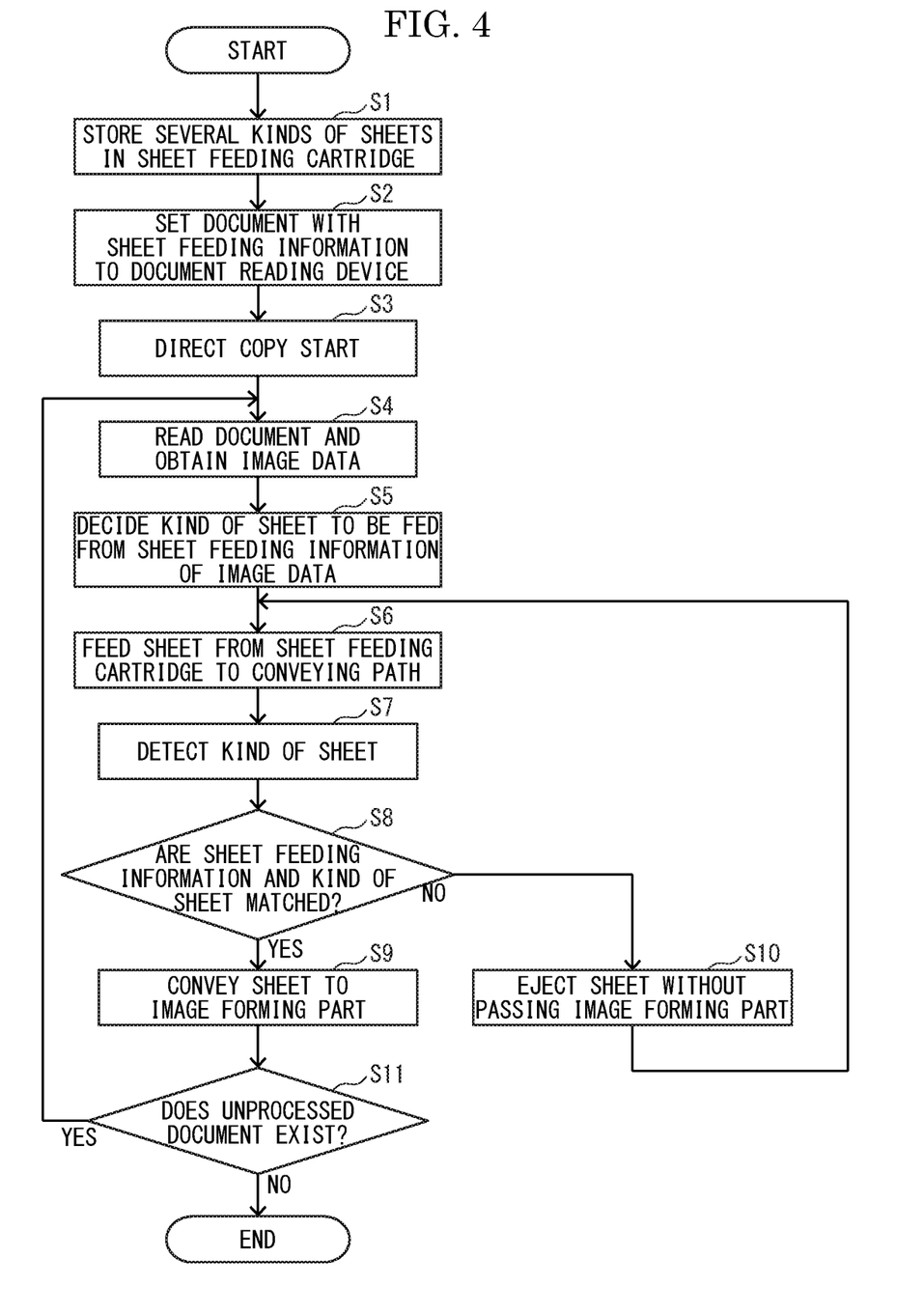
FIG. 4 is a flow chart showing the copying operation of the sheet selecting mode in the multifunction peripheral according the embodiment of the present disclosure.

Next, the copying operation of the sheet selecting mode in the multifunction peripheral 1 will be described with reference to a flow chart in FIG. 4. As described above, in the sheet selecting mode, a user needs previously storing the several kinds of the sheets in one sheet feeding cartridge 3 (step S1), as one example, stores the sheets different in a ground color. In addition, in the sheet selecting mode, the user needs previously adding sheet feeding information, which indicates the kind of the sheet to be fed from the sheet feeding cartridge 3, into the document being a copy object. The sheet feeding information is indicated by a character, a mark or the like, and may be printed on the document, may be written on the document with hand writing or may be written on a tag, a tape or the like and pasted on the document. Incidentally, the sheet feeding information is previously registered in the multifunction peripheral 1 as described later.

After the user sets the document with the sheet feeding information to the document reading device 7 (step S2), for example, places the document onto the supply tray 9a of the document conveying part 9, when the user operates the operation display part 10 to direct the copy start (step S3), the document reading device 7 is activated to read the document and to obtain the image data of the document (step S4). The image data of the document is transmitted to the controlling part 20 and the sheet feeding information reading part 22 reads and identifies the sheet feeding information on the basis of the image data to thereby decides the kind of the sheet to be fed (step S5).

Figure 3:
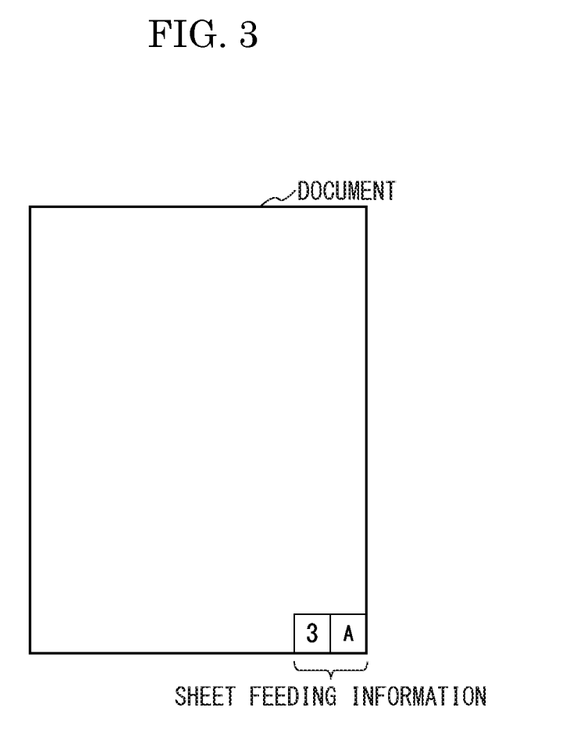
FIG. 3 is a plane view showing an example of a document processed in a copying operation of a sheet selecting mode in the multifunction peripheral according the embodiment of the present disclosure.

Reading of the sheet feeding information on the basis of the image data will be concretely described. In the multifunction peripheral 1, an applying position of the sheet feeding information on the document is previously defined and stored in the storing part 21, and the sheet feeding information reading part 22 carries out character recognition processing or the like to an image at the applying position of the image data to read the sheet feeding information. For example, the applying position of the sheet feeding information may be defined, as shown in FIG. 3, as a right lower end of the document or may be defined as another end.

Deciding of the kind of the sheet will be concretely described. In the multifunction peripheral 1, the sheet feeding information for each kind of the sheet is previously defined and stored in the storing part 21, and the sheet feeding information reading part 22 identifies to which of the previously defined sheet feeding informations the sheet feeding information read from the image data of the document corresponds to thereby decides the kind of the sheet. As one example, in the multifunction peripheral 1, the sheet feeding informations respectively corresponding to the ground colors of the sheets as the kinds of the sheets are previously defined, for instance, the sheet feeding information of a white sheet is defined as a character "A", the sheet feeding information of a red sheet is defined as a character "B", the sheet feeding information of a blue sheet is defined as a character "C", and the sheet feeding information of a yellow sheet is defined as a character "D". For example, as shown in FIG. 3, in a case where the character "A" as the sheet feeding information is applied on the document, the sheet feeding information reading part 22 decides that the sheet to be fed is a sheet with a white ground color. Incidentally, the sheet feeding information reading part 22 may stores the sheet feeding information read from the image data of the document as the sheet feeding information for the sheet to be fed in the storing part 21.

When the sheet to be fed is decided as described above, the selective conveyance controlling part 23 controls the sheet feeding part 15 to sequentially feed the sheet from the sheet feeding cartridge 3 to the conveying path 13 (step S6), and controls the sheet discriminating sensor 19 to detect the kind of each sheet fed to the conveying path 13 (step S7), for example, to detect the ground color of each sheet.

Moreover, the selective conveyance controlling part 23 compares the sheet feeding information (e.g. the ground color of the sheet) read by the sheet feeding information reading part 22 and the kind of the sheet (e.g. the ground color of the sheet) detected by the sheet discriminating sensor 19 to discriminate the sheet (step S8).

If the read sheet feeding information and the detected kind of the sheet are matched (step S8: YES), the selective conveyance controlling part 23 controls each conveying roller of the conveying path 13 so as to convey the sheet being currently fed in the conveying path 13 as a selective sheet corresponding to the sheet feeding information to the image forming part 12 and the fixing part 17 (step S9). For example, as shown in FIG. 3, in a case where the sheet feeding information on the document indicates the character "A" and the sheet to be fed is the sheet with the white ground color, the selective conveyance controlling part 23 controls so that, when the sheet fed from the sheet feeding cartridge 3 has the white ground color, this sheet is conveyed to the image forming part 12. Subsequently, by carrying out the image forming operation and a fixing operation, the image data obtained in the document reading device 7 is formed onto the selective sheet.

On the other hand, if the read sheet feeding information and the detected kind of the sheet are not matched (step S8: NO), the selective conveyance controlling part 23 controls each conveying roller of the conveying path 13 and the inversion path 14 so as to eject the sheet being currently fed in the conveying path 13 as a non-selective sheet not corresponding to the sheet feeding information without passing through the image forming part 12 and the fixing part 17 (step S10).

For example, the selective conveyance controlling part 23 may control each conveying roller of the conveying path 13 so as to eject the non-selective sheet to the second ejected sheet tray 6 or may control each conveying roller of the conveying path 13 and the inversion path 14 so as to eject the non-selective sheet to the first ejected sheet tray 4 with passing through the inversion path 14. Incidentally, the multifunction peripheral 1 may make the user select an ejection destination to any one of the first ejected sheet tray 4 and the second ejected sheet tray 6 in accordance with operation of the operation display part 10 by the user.

Incidentally, the inversion path 14 is generally used for duplex printing, and then, each conveying roller of the inversion path 14 is controlled so as to carry out switchback of the sheet outputted from the fixing part 17 to input the sheet to the inversion path 14, to convey the sheet in an opposite direction to the conveying direction of the conveying path 13 and to output the sheet to the conveying path 13 at an upstream side from the image forming part 12. However, in a case where the inversion path 14 is used when the sheet is ejected to the first ejected sheet tray 4 in the sheet selecting mode, each conveying roller of the inversion path 14 is controlled so as to convey the sheet fed from the sheet feeding cartridge 3 to the conveying path 13 to input the sheet to the inversion path 14, to convey the sheet in an opposite direction to duplex printing, i.e. in the same direction as the conveying direction of the conveying path 13, and to output the sheet to the ejecting part 18.

Subsequently, until the read sheet feeding information and the detected kind of the sheet are matched, the selective conveyance controlling part 23 repeats feeding of the sheet from the sheet feeding cartridge 3 to the conveying path 13 (step S6) and discriminating of the sheet on the basis of the sheet feeding information (steps S7 and S8). Moreover, in a case where the copying operation of a plurality of documents is carried out, if an unprocessed document exists in the document reading device (step S10: YES), a series of operations described above, i.e. operations from obtaining of the image data in the document reading device 7 (step S4) to the image forming operation and the fixing operation via selecting of the sheet corresponding to the sheet feeding information (step S8: YES and step S9) is repeated with regard to each document.

Incidentally, in the above-described embodiment, although an example of the multifunction peripheral 1 reading the sheet feeding information indicating the ground color of the sheet applied on the document, discriminating the ground color of the sheet fed from the sheet feeding cartridge 3 and selecting the sheet corresponding to the ground color indicated by the sheet feeding information is described, the present disclosure is not restricted by this example. For example, in another embodiment, the multifunction peripheral 1 may be configured to read the sheet feeding information indicating a thickness of the sheet applied on the document, to discriminate the thickness of the sheet fed from the sheet feeding cartridge 3 and to select the sheet corresponding to the thickness indicated by the sheet feeding information. In this case, the multifunction peripheral 1 may include an ultrasonic wave sensor or the like detecting the thickness of the sheet as the sheet discriminating sensor 19.

Alternatively, in another embodiment, the multifunction peripheral 1 may be configured to read the sheet feeding information indicating a storing order of the sheet applied on the document, to discriminate the storing order of the sheet on the basis of a conveying order the sheet fed from the sheet feeding cartridge 3 and to select the sheet corresponding to the storing order indicated by the sheet feeding information. In this case, may include a counter counting the sheet fed from the sheet feeding cartridge 3 or the selective conveyance controlling part 23 may count the sheet.

For example, as shown in FIG. 3, in a case where a character "3" as the sheet feeding information is applied on the document, the sheet feeding information reading part 22 decides that the sheet to be fed is the sheet stored in the sheet feeding cartridge 3 with the storing order of third from the top. Subsequently, the selective conveyance controlling part 23 controls to eject the sheets fed first and second from the sheet feeding cartridge 3 to the first ejected sheet tray 4 or the second ejected sheet tray 6, and then, to convey the sheet fed third from the sheet feeding cartridge 3 to the image forming part 12.

Incidentally, the multifunction peripheral 1 may not restrict to a case of applying one sheet feeding information out of the sheet feeding informations, such as the ground color, the thickness and the storing order of the sheet, but may apply combination of two or more sheet feeding informations.

Moreover, in a case of carrying out the copying operation of the plurality of documents in the sheet selecting mode, the sheet feeding information reading part 22 may stores the sheet feeding information read from the preceding document as the sheet feeding information common to the following documents in the storing part 21. In this case, the selective conveyance controlling part 23 uses the sheet feeding information common to the documents not only in a case of selecting and conveying the sheet in the copying operation of the preceding document but also in a case of selecting and conveying the sheets in the copying operation of the following documents. Incidentally, when the sheet feeding information reading part 22 newly reads the sheet feeding information from the following document, the common sheet feeding information stored in the storing part 21 may be updated by the new sheet feeding information of the following document.

In the above-described embodiment, although an example of the multifunction peripheral 1 carrying out the copying operation in the sheet selecting mode by using the sheet feeding information applied to the document being the copy object is described, the present disclosure is not restricted by this example. For example, in another embodiment, the multifunction peripheral 1 may carry out the copying operation in the sheet selecting mode by using the sheet feeding information applied to a white document just before the document being the copy object.

In this case, first, the document reading device 7 reads the white document and obtains the image data of the white document, the sheet feeding information reading part 22 reads the sheet feeding information on the basis of the image data of the white document, and then, the sheet feeding information is stored for the copying operation of the documents following the white document in the storing part 21 and the image data of the white document is deleted. Subsequently, in a case of carrying out the copying operation in the sheet selecting mode with regard to the documents following the white document, the selective conveyance controlling part 23 selects the sheet fed from the sheet feeding cartridge 3 on the basis of the sheet feeding information of the white document to convey the sheet to the image forming part 12. Incidentally, in the plurality of documents, the white document, to which the sheet feeding information is applied, is not restricted by the first document, but may be put or interposed at a desired position in which the sheet feeding information is changed.

In accordance with the present embodiment, as described above, the multifunction peripheral 1 (the image forming apparatus) includes the image reading part 8 reading the document and obtaining the image data of the document, the image forming part 12 forming the image on the sheet on the basis of the image data, and the sheet feeding cartridge 3 storing the several kinds of the sheets. Subsequently, the controlling part 20 (the sheet feeding information reading part 22) reads the sheet feeding information on the basis of the image data in a case where the predetermined sheet feeding information is applied on the document. Moreover, the controlling part 20 (the selective conveyance controlling part 23) controls conveying of the sheet so as to convey the sheet corresponding to the sheet feeding information from the sheet feeding cartridge 3 to the image forming part 12 and, on the other hand, to eject the sheet not corresponding to the sheet feeding information from the sheet feeding cartridge 3 without passing through the image forming part 12.

Thereby, even if only one sheet feeding cartridge 3 is provided, the multifunction peripheral 1 can select and feed the desired kind of the sheet out of the several kinds of the sheets stored in the sheet feeding cartridge 3. Therefore, in comparison with a case where a plurality of sheet feeding cartridges 3 are provided, it is possible to reduce costs and installation space and to restrain labor required for installation. Incidentally, the user can make the multifunction peripheral 1 feed the desired kind of the sheet by a simple manner of applying the sheet feeding information on the document without needing complex operation. Moreover, since the unselected sheet is ejected without passing through the image forming part 12, dirt and wrinkle are not caused in the sheet and the sheet can be stored in the sheet feeding cartridge 3 again and be used anew. Thus, in accordance with the present disclosure, regardless of the number of installed sheet feeding cartridges 3, it is possible to selectively feed the different kinds of the sheets.

For example, the multifunction peripheral 1 further includes the sheet discriminating sensor 19 detecting the kind of the sheet conveyed from the sheet feeding cartridge 3. In this case, the sheet feeding information indicates the kind, such as the ground color or the thickness, of the sheet. Subsequently, the selective conveyance controlling part 23 compares the sheet feeding information and the kind of the sheet detected by the sheet discriminating sensor 19 to decide whether or not the sheet fed from the sheet feeding cartridge 3 corresponds to the sheet feeding information. Thereby, since the kind of the sheet fed from the sheet feeding cartridge 3 is certainly discriminated, it is possible to certainly decide the sheet corresponding to the sheet feeding information.

Alternatively, in the multifunction peripheral 1, the sheet feeding information indicates the storing order of the sheet in the sheet feeding cartridge 3. Subsequently, the selective conveyance controlling part 23 decides the storing order on the basis of the conveying order of the sheet conveyed from the sheet feeding cartridge 3 to decide whether or not the sheet conveyed from the sheet feeding cartridge 3 corresponds to the sheet feeding information. Thereby, even if the sheet of the kind hardly discriminated by the sheet discriminating sensor 19 is stored in the sheet feeding cartridge 3, it is possible to select and feed the desired kind of the sheet. For example, in the multifunction peripheral 1, not only an unused sheet but also a used backing sheet may be used as an object for image forming, such as copy or the like, and then, a predetermined number of the unused sheets and a predetermined number of the used backing sheets may be stored in the sheet feeding cartridge 3. In such a case, it is possible to selectively feed the unused sheets and the used backing sheets.

Incidentally, in the above-described embodiment, although an example of the selective conveyance controlling part 23 repeating feeding of the sheet from the sheet feeding cartridge 3 (step S6) and discriminating of the sheet on the basis of the sheet feeding information (steps S7 and S8) is described, the present disclosure is not restricted by this example. For example, in another embodiment, a predetermined upper limit number of the sheets compared with the sheet feeding information may be set.

Concretely, the selective conveyance controlling part 23 counts the number of the sheets ejected to the first ejected sheet tray 4 or the second ejected sheet tray 6 when the sheet feeding information and the kind of the sheet are not matched. Subsequently, in a case where the number of the ejected sheets reaches the predetermined upper limit number, the selective conveyance controlling part 23 outputs notification of non-detection of the sheet corresponding to the sheet feeding information by a warning screen via the operation display part 10 or an alarm via a speaker (not shown) to the user. Thereby, in a case where the sheet feeding information applied on the document is mistaken or a case where the sheet to be fed is not stored in the sheet feeding cartridge 3, it is possible to restrain sheet detection from falling into an infinite loop.

Incidentally, although the description of the embodiments illustrates an example of the image forming apparatus according to the present disclosure, the technical scope of the present disclosure is not limited to the embodiments.

Although the embodiment is described about a case applying the configuration of the present disclosure to the multifunction peripheral 1, in a further different embodiment, the configuration of the present disclosure may be applied to another image forming apparatus including the image reading part 8.

The invention claimed is:

1. An image forming apparatus comprising:
an image reading part reading a document and obtaining image data of the document;
an image forming part forming an image on a sheet on the basis of the image data;
one sheet feeding cartridge storing several kinds of the sheets;
a storing part storing defined information as information of sheet feeding previously defined for respective kinds of the sheets; and
a sheet feeding information reading part reading predetermined sheet feeding information applied on the document on the basis of the image data, and identifying to which of the defined information stored in the storing part the read sheet feeding information corresponds,
wherein
on the basis of an identification result of the sheet feeding information reading part, conveying of the sheet is controlled so as to convey the sheet corresponding to the sheet feeding information from the one sheet feeding cartridge to the image forming part and, on the other hand, to eject the sheet not corresponding to the sheet feeding information from the one sheet feeding cartridge without passing through the image forming part.

2. The image forming apparatus according to claim 1 further comprising:
a sheet discriminating sensor detecting a kind of the sheet conveyed from the sheet feeding cartridge,
wherein the sheet feeding information indicates the kind of the sheet,
the sheet feeding information and the kind of the sheet detected by the sheet discriminating sensor are compared to decide whether or not the sheet fed from the one sheet feeding cartridge corresponds to the sheet feeding information.

3. The image forming apparatus according to claim 1, wherein
the sheet feeding information indicates a storing order of the sheet in the sheet feeding cartridge,
the storing order is decided on the basis of a conveying order of the sheet conveyed from the one sheet feeding cartridge to decide whether or not the sheet conveyed from the one sheet feeding cartridge corresponds to the sheet feeding information.

4. The image forming apparatus according to claim 1, wherein
the sheet feeding information is applied as combination of two or more sheet feeding informations.

5. The image forming apparatus according to claim 1, wherein the sheet feeding information read from a proceeding document is used as the sheet feeding information common to following documents.

6. The image forming apparatus according to claim 1, wherein in a case where the number of the sheets decided as not-corresponding to the sheet feeding information and ejected from the one sheet feeding cartridge reaches a predetermined upper limit number, notification of non-detection of the sheet corresponding to the sheet feeding information is outputted to the user.

* * * * *